US008355699B1

(12) United States Patent
Lo et al.

(10) Patent No.: US 8,355,699 B1
(45) Date of Patent: Jan. 15, 2013

(54) METHOD OF PREVENTING DATA OF MOBILE PHONE FROM BEING STOLEN

(76) Inventors: Kuo-Hung Lo, Taoyuan County (TW); Shu-Ping Huang, Taoyuan County (TW)

( * ) Notice: Subject to any disclaimer, the term of this patent is extended or adjusted under 35 U.S.C. 154(b) by 0 days.

(21) Appl. No.: 13/372,509

(22) Filed: Feb. 14, 2012

(51) Int. Cl.
*H04W 4/00* (2009.01)
(52) U.S. Cl. ........................................ 455/411; 455/466
(58) Field of Classification Search .................. 455/466, 455/418, 419, 414.1, 558, 410, 450, 420, 455/433, 73, 411, 456.1, 564; 709/214, 206, 709/204, 227, 219; 370/254
See application file for complete search history.

(56) References Cited

U.S. PATENT DOCUMENTS 6,615,246 B2 * 9/2003 Pivowar et al. ............... 709/214

* cited by examiner

*Primary Examiner* — Kiet Doan

(57) ABSTRACT

A method of preventing data of a mobile phone from being stolen, particularly the method of preventing personal data stored in a mobile phone from being stolen by the means of sending short messages and inputting an instruction code is disclosed, and the method comprises: defining plurality of confidentiality levels of the mobile phone, and each confidentiality level defines a corresponding instruction code and is added to personal data stored in the mobile phone, and the mobile phone compares and determines whether the short message contains the instruction code when receiving the short message, and reads the confidentiality level corresponding to the instruction code, and updates all personal data of the of the confidentiality level to achieve the effect of preventing the data from being stolen.

6 Claims, 6 Drawing Sheets

METHOD OF PREVENTING DATA OF MOBILE PHONE FROM BEING STOLEN

BACKGROUND OF THE INVENTION

1. Field of the Invention

The present invention relates to a method of preventing data of a mobile phone from being stolen, in particular to the method that prevents personal data stored in a mobile phone from being stolen by the method of sending short messages and inputting an instruction code.

2. Description of the Prior Art

Mobile phone, also known as hand set, is a wireless communication device, having a control program unit installed therein and a chip and a circuit containing a driver program used for controlling the mobile phone to receive an incoming call signal and controlling the mobile phone to dial a call. As network and communication technologies advance rapidly, mobile phones generally come with a memory unit integrated with the control program unit to further provide the functions of saving or recording telephone numbers, texts and numeral data, transmitting emails and photos, and even connecting to a network in addition to the original functions of making and receiving a phone call.

The more powerful the memory and storage functions of the mobile phone, the larger is the quantity of recorded personal data including a user's or other's telephone numbers, emails, photos, numeral or text data, so that the issue of confidentiality becomes increasingly important. However, if the mobile phone is lost, personal data may leak and result in all kinds of fraud cases easily, so that finding a way to prevent personal data stored in mobile phones from leaking demands immediate attentions and feasible solutions.

However, there is still no effective technique to prevent personal data stored in mobile phones from being read, unloaded or stolen illegally, and the present invention attempts to break through the bottleneck and provides a solution to overcome the problems of the prior art.

SUMMARY OF THE INVENTION

Therefore, it is a primary objective of the present invention to overcome the problems of the prior art by providing a method of preventing personal data stored in a mobile phone from being stolen by the method of sending a short message and inputting an instruction code, so that confidential personal data stored in the mobile phones can be protected from being read, unloaded or stolen illegally, particularly when the mobile phones are lost or missing.

To achieve the aforementioned objective, the present invention provides a method of preventing data of a mobile phone from being stolen, comprising:

using the mobile phone capable of storing a plurality of personal data, and defining a plurality of confidentiality levels according to the level of importance of the personal data by a control program unit installed in the mobile phone, and also defining a corresponding instruction code for each of the confidentiality levels;

saving the personal data one by one into a memory unit in the mobile phone when the personal data are entered, and adding the confidentiality level to each of the personal data by the control program unit;

actively comparing and determining whether a short message (or short message service, SMS) contains the instruction code by the control program unit, after completing saving the personal data, and a short message through the control program unit; and reading the confidentiality level corresponding to the instruction code by the control program unit, if the control program unit compares and determines the short message contains the instruction code, and updating all of personal data of the confidentiality level.

Therefore, the present invention can adopt the method of transmitting a short message containing the instruction code to a missing or lost mobile phone, such that if the lost mobile phone is turned on, the personal data will be updated automatically, and the updated data will be different from the original data or difficult to recognize and recover the data, so as to prevent the personal data stored in the mobile phone from being stolen.

In the present invention, the personal data include other's telephone number, email, photo, numeral, or text data.

In the present invention, the instruction code is inputted by a user to define the confidentiality level.

In the present invention, the instruction code is a numeral, a text, a symbol, and any combination of the above.

In the present invention, the control program unit updates the personal data by deleting or overwriting the data.

In the present invention, the method further comprises the control program unit that stops the comparison if the short message does not contain the instruction code.

DETAILED DESCRIPTION OF THE PREFERRED EMBODIMENTS

Figure 1:
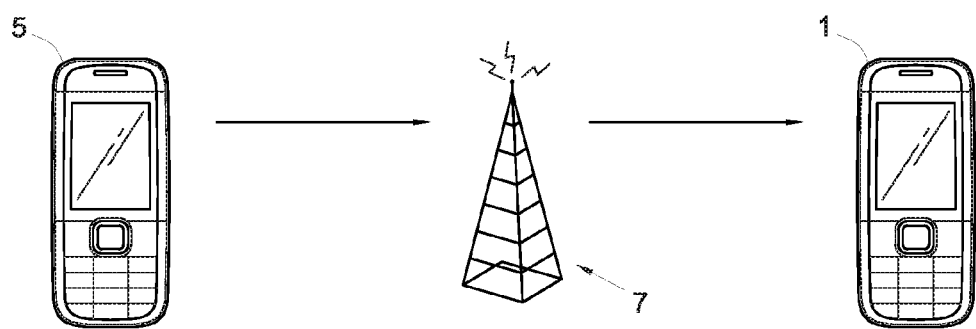
FIG. 1 is a schematic view of a configuration of a method in accordance with a preferred embodiment of the present invention.
Figure 2:
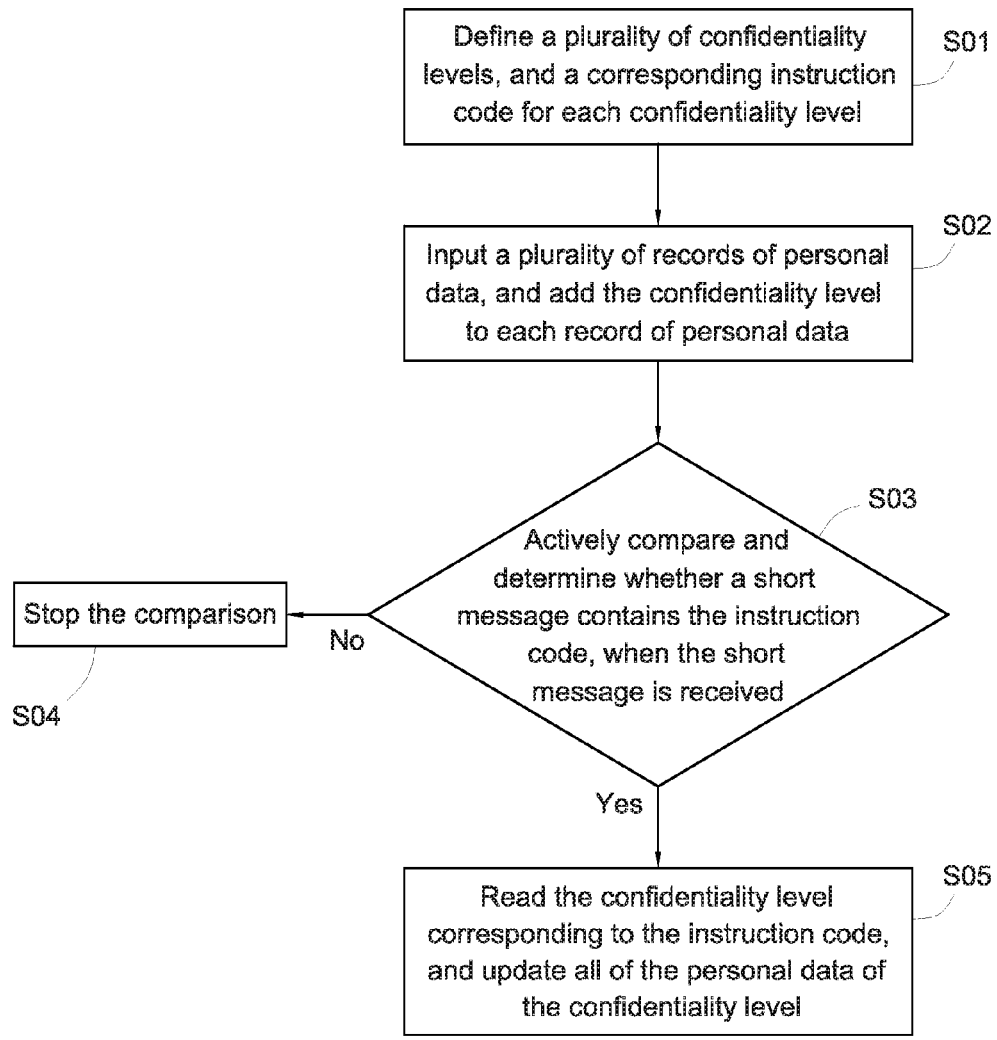
FIG. 2 is a flow chart of a method of the present invention.
Figure 3:
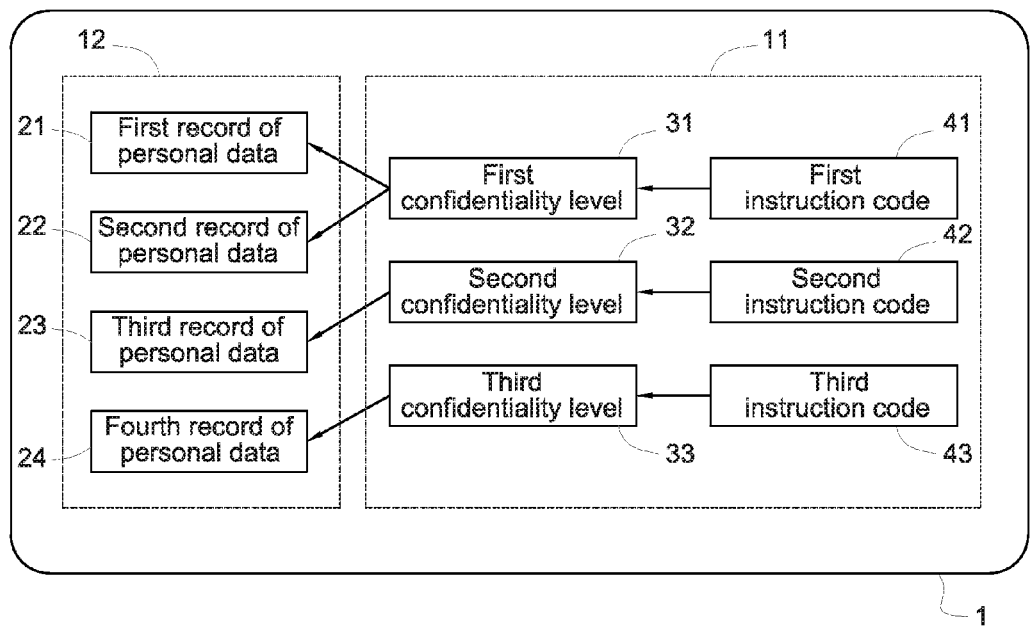
FIG. 3 is a block diagram of a configuration of a method of the present invention.
Figure 4:
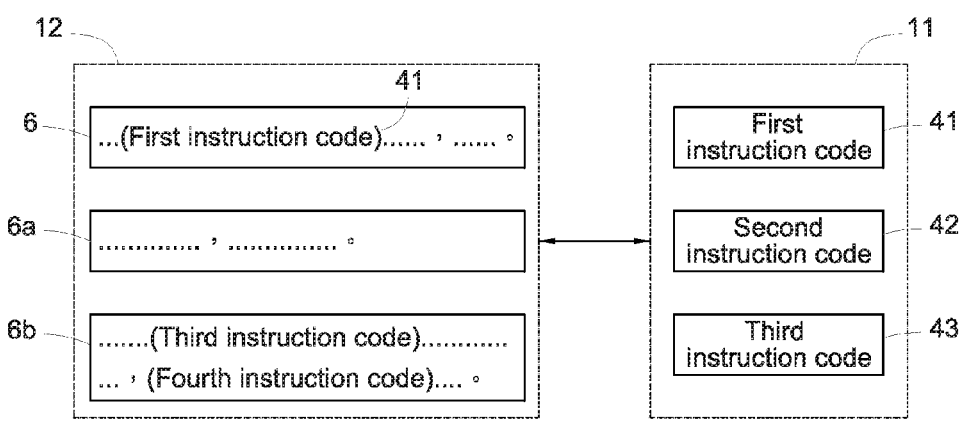
FIG. 4 is a block diagram of another configuration of a method of the present invention.

With reference to FIG. 1 for a schematic view of a configuration of a method in accordance with a preferred embodiment of the present invention together with FIGS. 2 to 4, the method of preventing data of a mobile phone from being stolen comprises the steps of:

<Before Personal Data are Saved>

S01: Use a mobile phone 1 capable of saving a plurality of personal data 21, 22, 23, 24, and define a plurality of confidentiality levels 31, 32, 33 according to the level of importance of the personal data 21, 22, 23, 24 by a control program unit 11 installed in the mobile phone 1, wherein the confidentiality levels are divided into a first confidentiality level 31, a second confidentiality level 32 and a third confidentiality level 33 in a descending order.

The control program unit 11 can be a chip and a circuit containing a driver program, and the mobile phone 1 provides the functions of making/receiving a telephone call and storage, recording the telephone number, text and numeral data, transmitting the email, and connecting to a network through the chip and the circuit.

Figure 5:
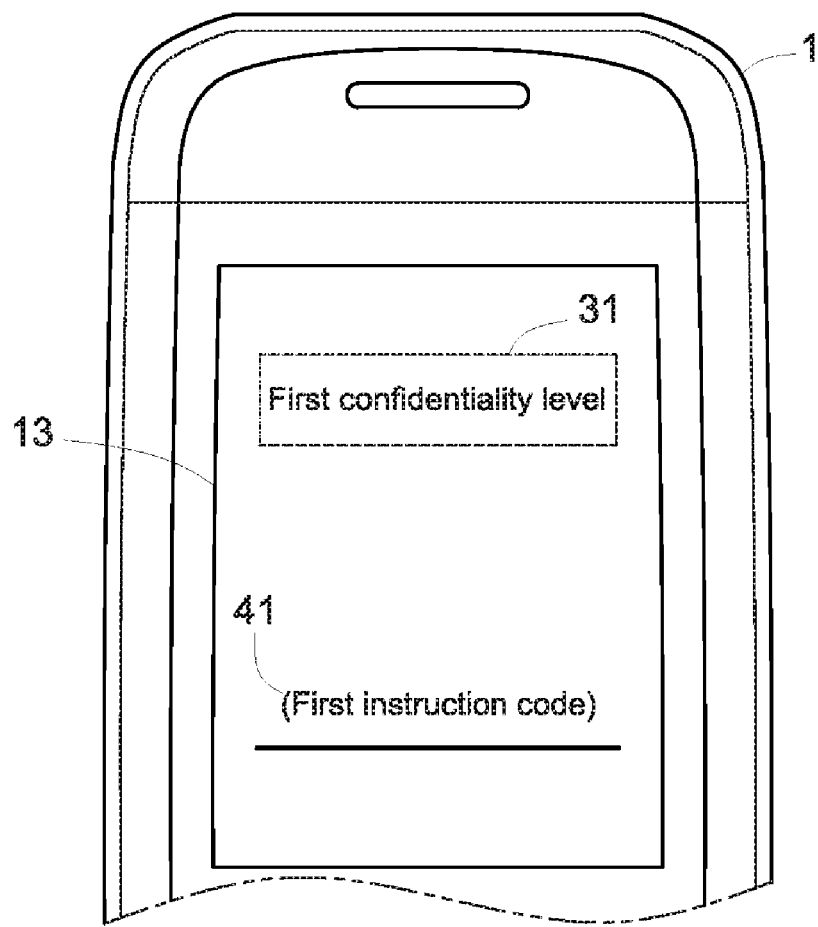
FIG. 5 is a partial blow-up view of the mobile phone of FIG. 1.
Figure 6:
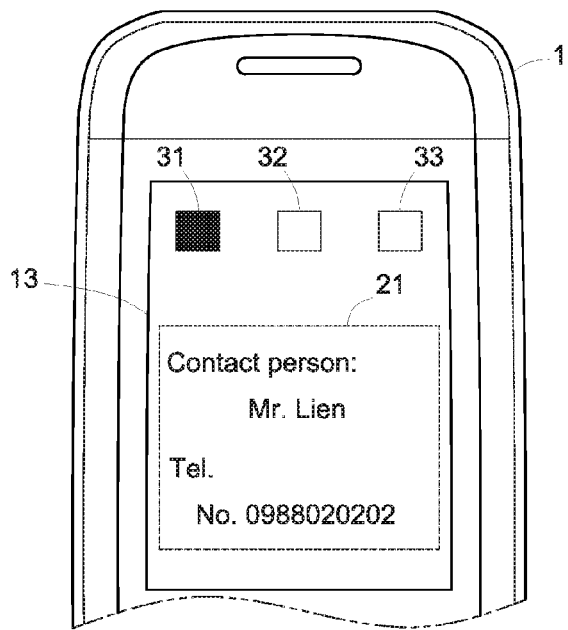
FIG. 6 shows a first using status of FIG. 5.
Figure 7:
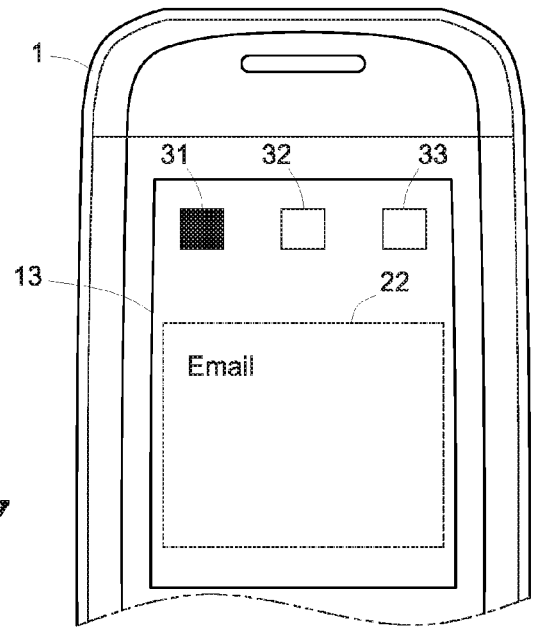
FIG. 7 shows a second using status of FIG. 5.
Figure 8:
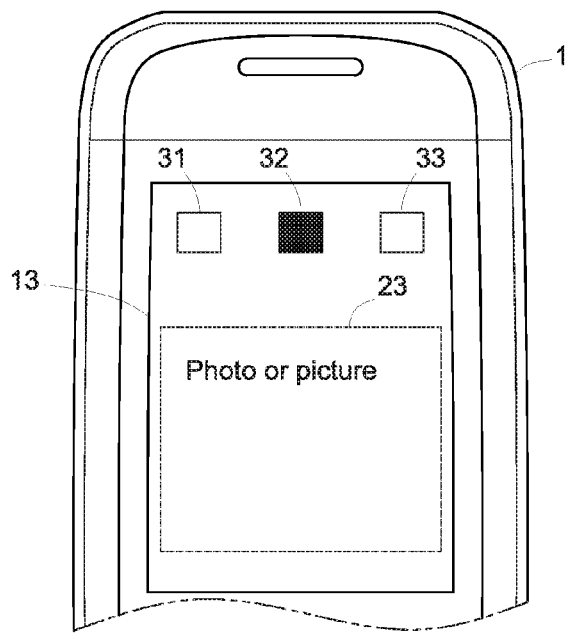
FIG. 8 shows a third using status of FIG. 5.
Figure 9:
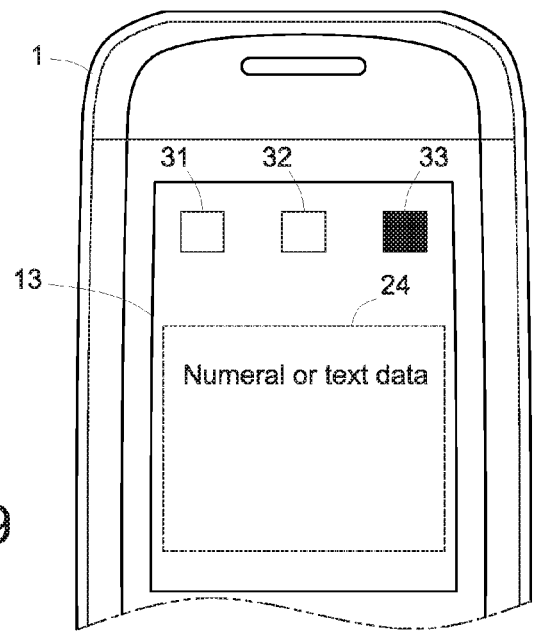
FIG. 9 shows a fourth using status of FIG. 5.

Define a corresponding instruction code 41, 42, 43 for the first, second and third confidentiality level 31, 32, 33 (as shown in FIG. 5), wherein the instruction codes 41, 42, 43 include a first instruction code 41 defined for the first confidentiality level 31, a second instruction code 42 defined for the second confidentiality level 32, and a first instruction code 43 defined for the third confidentiality level 33.

The first, second, third instruction codes 41, 42, 43 can be a numeral, a text, symbol, or any combination of the above. The first, second and third instruction codes 41, 42, 43 are defined for the first, second, third confidentiality level 31, 32, 33 and inputted by users through an image display 13 of the mobile phone 1.

<After Personal Data are Saved>

S02: Save the personal data 21, 22, 23, 24 one by one into a memory unit 12 installed in the mobile phone 1, and the personal data 21, 22, 23, 24 can include other persons' telephone number, email, photo, picture, numeral or text data.

In this preferred embodiment, the personal data are divided into first record personal data 21 that record another person's telephone number; second record personal data 22 that record an email; third record personal data 23 that save a photo or picture; and fourth record personal data 24 that record numeral or text data.

The control program unit 11 adds the first, second and third confidentiality levels 31, 32, 33 to each of the first, second, third and fourth records of personal data 21, 22, 23, 24.

In this preferred embodiment, the first confidentiality level 31 is added to the first record personal data 21, the first confidentiality level 31 is added to the second record personal data 22, the second confidentiality level 32 is added to the third record personal data 23, and the third confidentiality level 33 is added to the fourth record personal data 24.

The first, second and third confidentiality levels 31, 32, 33 are listed in an option box on a display 13 of the mobile phone 1 (as shown in FIGS. 6 to 9), and the first, second, third and fourth records of personal data 21, 22, 23, 24 can be written into the memory unit 12 by inputting the data by the users through the display 13, and defined for any one of the first, second and third confidentiality levels 31, 32, 33 by clicking the desired confidentiality level from the option box.

<After the Personal Data are Saved>

S03: If the mobile phone 1 is lost, the owner of the mobile phone 1 can send a short message (short message service, SMS) 6 to the owner of the mobile phone 1 from another mobile phone 5 through a base station 7. After the control program unit 11 of the lost mobile phone 1 receives the short message 6, the short message 6 is saved into the memory unit 12 (as shown in FIG. 4), and the control program unit 11 actively compares and determines whether the short message 6 contains any one of the first, second and third instruction codes 41, 42, 43.

The owner of the lost mobile phone 1 can send a plurality of short messages 6, 6a, 6b to the lost mobile phone 1 according to the actual situations, wherein the short messages 6, 6a, 6b may include or not include the first, second and third instruction codes 41, 42, 43.

S04: If the control program unit 11 of the mobile phone 1 compares and determines that the short message 6a does not include any one of the first, second and third instruction codes 41, 42, 43, then the control program unit 11 will stop the comparison.

S05: If the control program unit 11 of the mobile phone 1 compares and determines that the short message 6a includes any one of the first, second and third instruction codes 41, 42, 43, then the control program unit 11 will read the first confidentiality level 31 corresponding to the first instruction code 41, and update all of the first and second records of personal data 21, 22 corresponding to the first confidentiality level 31.

If the control program unit 11 compares and determines that the short message 6b includes the second and third instruction codes 42, 43, then the control program unit 11 will read the second confidentiality level 32 corresponding to the second instruction code 42 and the third confidentiality level 33 corresponding to the third instruction code 43, and will update all of the third record personal data 23 of the second confidentiality level while updating all of the fourth record personal data 24 of the third confidentiality level 32.

It is noteworthy to point out that the control program unit 11 of the mobile phone 1 updates the first, second, third and fourth records of personal data 21, 22, 23, 24 by deleting or overwriting the data, so that others cannot steal, recognize or recover the first, second, third and fourth records of the personal data 21, 22, 23, 24.

The present invention can send a short message 6, 6a, 6b containing the first, second and third instruction codes 41, 42, 43 to the lost mobile phone 1, so that as long as the lost mobile phone 1 is turned on, the saved first, second, third and fourth records of personal data 21, 22, 23, 24 are updated, and the updated data are different from the original data, or difficult to recognize or recover, so as to as achieve the effects of overcoming the problems of the prior art and preventing the personal data stored in a lost mobile phone from being read, downloaded or stolen illegally.

What is claimed is:

1. A method of preventing data of a mobile phone from being stolen, comprising:

using the mobile phone capable of storing a plurality of personal data, and defining a plurality of confidentiality levels according to the level of importance of the personal data by a control program unit installed in the mobile phone, and also defining a corresponding instruction code for each of the confidentiality levels;

saving the personal data into a memory unit in the mobile phone when the personal data are entered, and adding the confidentiality level to each of the personal data by the control program unit;

actively comparing and determining whether a short message contains the instruction code by the control program unit, after completing saving the personal data, and a short message through the control program unit; and reading the confidentiality level corresponding to the instruction code by the control program unit, if the control program unit compares and determines the short message contains the instruction code, and updating all of personal data of the confidentiality level.

2. The method of preventing data of a mobile phone from being stolen as recited in claim 1, wherein the personal data include other's telephone number, email, photo, numeral or text data.

3. The method of preventing data of a mobile phone from being stolen as recited in claim 1, wherein the instruction code is inputted by a user to define the confidentiality level.

4. The method of preventing data of a mobile phone from being stolen as recited in claim 1, wherein the instruction code is one selected from the collection of a numeral, a text, a symbol, and any combination thereof.

5. The method of preventing data of a mobile phone from being stolen as recited in claim 1, wherein the control program unit updates the personal data by deleting or overwriting the data.

6. The method of preventing data of a mobile phone from being stolen as recited in claim 1, further comprising the control program unit that stops the comparison if the short message does not contain the instruction code.

* * * * *